United States Patent
McCauley

(10) Patent No.: US 9,691,575 B2
(45) Date of Patent: Jun. 27, 2017

(54) HOPPER CONTROL ACTUATOR

(71) Applicant: Way-More, Ailsa Craig (CA)

(72) Inventor: Wayne McCauley, Ailsa Craig (CA)

(73) Assignee: Way-More, Ailsa Craig (CA)

( * ) Notice: Subject to any disclaimer, the term of this patent is extended or adjusted under 35 U.S.C. 154(b) by 0 days.

(21) Appl. No.: 15/086,734

(22) Filed: Mar. 31, 2016

(65) Prior Publication Data

US 2016/0300675 A1    Oct. 13, 2016

Related U.S. Application Data

(60) Provisional application No. 62/145,583, filed on Apr. 10, 2015.

(51) Int. Cl.
*H01H 9/00* (2006.01)
*H01H 36/00* (2006.01)
*A01K 39/012* (2006.01)
*H01H 15/14* (2006.01)

(52) U.S. Cl.
CPC ....... *H01H 36/0073* (2013.01); *A01K 39/012* (2013.01); *H01H 15/14* (2013.01)

(58) Field of Classification Search
CPC .......................... H01H 36/0073; A01K 39/012
USPC ........................................................ 335/205
See application file for complete search history.

(56) References Cited

U.S. PATENT DOCUMENTS

| | | | |
|---|---|---|---|
| 2,741,450 A | 4/1956 | Thayer et al. | |
| 3,611,220 A * | 10/1971 | Hoffman | H01H 36/0073 200/82 C |
| 3,622,922 A * | 11/1971 | Mogi | H03K 17/972 335/2 |
| 3,749,285 A | 7/1973 | Latham, Jr. | |
| 3,942,145 A * | 3/1976 | Sobczak | H01H 5/02 200/288 |

(Continued)

FOREIGN PATENT DOCUMENTS

| CN | 201413798 Y | 2/2010 |
|---|---|---|
| GB | 1206157 | 9/1970 |

OTHER PUBLICATIONS

Valco, "Spinks Scales Instructions/Operator's Manual for Rooster Scales"; Manual No. 000252; Jan. 2000; pp. 1-18; http://www.valco.com/pdfs/manuals/000252%20Spinks%20Rooster%20Scale%20Manual.pdf.

*Primary Examiner* — Shawki S Ismail
*Assistant Examiner* — Lisa Homza
(74) *Attorney, Agent, or Firm* — Miltons IP/p.i.

(57) ABSTRACT

A hopper control actuator is provided. The actuator has a frame having a first bracket at a top end for attaching to a hopper, a second bracket at a bottom end for attaching to an overhead support, and at least one strut between the top end and bottom end; a sliding member attached to the frame having of an outer tube, an inner tube and a spring, the inner tube being slidable within the outer tube and having a first magnet affixed on an exterior surface thereof, the spring being connected to the inner tube and the first bracket, the inner tube and the outer tube having complimentary corners to prevent rotation; and an electrical enclosure having a micro-switch mounted therein, the electrical enclosure being attached to the at least one strut and the micro-switch having an actuating lever with a second magnet affixed thereto such that a like pole faces a like pole of the first magnet along a length of a path of travel of the first magnet.

10 Claims, 4 Drawing Sheets

(56) References Cited

U.S. PATENT DOCUMENTS

| | | | | |
|---|---|---|---|---|
| 3,950,719 | A | * | 4/1976 | Maxwell ................ H01H 41/00 335/205 |
| 4,409,576 | A | * | 10/1983 | Petersen ............ H01H 36/0073 335/170 |
| 4,495,388 | A | | 1/1985 | Yoder |
| 4,627,283 | A | * | 12/1986 | Nishida .................. G01F 23/72 200/84 C |
| 4,638,274 | A | * | 1/1987 | Archer ..................... H01H 1/08 335/52 |
| 4,658,230 | A | * | 4/1987 | Yamamoto ........ H01H 51/2227 335/230 |
| 5,621,393 | A | | 4/1997 | Urich |
| 5,896,898 | A | | 4/1999 | Crossdale et al. |
| 6,067,854 | A | | 5/2000 | Yang |
| 6,202,676 | B1 | | 3/2001 | Bekedam |
| 6,439,821 | B1 | | 8/2002 | Carlyle |
| 6,501,357 | B2 | * | 12/2002 | Petro ......................... H01F 7/13 310/17 |
| 6,720,852 | B2 | * | 4/2004 | Farrey .................... H01H 37/56 335/207 |
| 6,779,486 | B2 | | 8/2004 | Vaags |
| 8,736,406 | B2 | * | 5/2014 | Hapke .................... D06F 37/42 292/251.5 |

\* cited by examiner

HOPPER CONTROL ACTUATOR

TECHNICAL FIELD

The present application relates to an actuator for controlling a hopper.

BACKGROUND

The poultry industry is a high demand, high volume industry, in which a bird is required to consume high energy and nutritious feed, therefore having feed available to eat from the feeding systems is paramount when the bird is hungry.

Existing feeding systems comprise multiple feeding pans connected together with a supply tube and within it, an auger transfer means, in long rows the length of the barn. All pans will be filled with feed when the system turns on to fill the pans. The auguring feeding system is supplied by an intermediate feeder hopper at one end of the system. When the supply hopper becomes empty, it is refilled by a supply from a main storage tank outside of the facility.

Switches and/or other sensors are used in the feeding systems to activate the feeding system to feed the pans. Additionally there is a switch needed to fill the intermediate hopper, which requires replenishing as the feeding system draws feed from the intermediate hopper.

Currently within the industry there are two main types of hopper control designs which are utilized: a flap design and a suspended design.

The flap design relies on being inside the hopper among the flow of the feed. The feed will depress a micro switch, by an expanding pressure applied to a flap placed in front of the micro switch. This design is a very simple idea, and has been a very common method of control, but has many shortcomings. One of the biggest challenges in the flap design, is that the hinge that the flap operates, becomes greasy from the feed ingredients, and becomes clogged up with dust and debris, and becomes stuck in either a run or stopped position, which creates difficulties to the equipment or the livestock. If it is stuck in the run position, the motor is receiving a run signal from the switch, and is functioning on its backup safety shut-off switch by the motor, and is operating in very short, loaded cycles, which is very taxing on the electric motors. Alternatively, when the switch is stuck in the stopped position, which is the most common, the feed system will not fill the line, which is now running empty, causing wear and tear on the equipment, wasting energy running motors which are accomplishing nothing, and livestock may be in a situation where there is no feed present to consume and creates duress and loss of production in the animals.

In addition to the flap sticking in a position, there is also a micro switch with mechanical components that are exposed to the feed or dusty environments. While the flap may be free to function, the mechanical device controlling the micro switch fails to operate, causing the same problems as the no feed situation as mentioned earlier.

There are several other problems with the flap design. Feed can build up and jam the flap within the frame, preventing it from operating properly. Feed and buildup can form on the flap, creating a mass, and preventing the flap to extend outwards to start filling again. Livestock occasionally hit or bang into the hopper, where the switch is mounted inside and can cause it to bounce or shake, causing the motor to start and stop quickly, reducing the lifespan of the motor. The starting amp loads through the micro switch repeatedly can cause premature failure and burnout. Sometimes certain components are made up of plastic which wear and/or break. Micro switches commonly burnout or become clogged and fail to function properly and reliably. Sometimes they simply get damaged and bent or broken from installation errors or neglect.

The suspended design operates by hanging in-line to support the hopper. It operates without the need to be within the flow of feed and is a superior method to the flap design. One example of this design is called the "Harkin's Hopper Control Switch" and is described in U.S. Pat. No. 5,389,753). It has been a very reliable method of controlling the feed supply to a hopper, but it has its own shortcomings. There is a required contact between two members to activate the micro switch. This method creates a couple of challenges and causes some inefficiency. The contacting flange is not square to the axis of its operation. Being made of cylindrical materials, the outer member is able to rotate on the second inner member. The micro switch is affixed to the second sliding member and when the first member rotates around, because the flange is not square, the micro switch is not able to contact the flange. Thus, the feed system will run empty because the switch has fallen out of its range of adjustment. Likewise, when the flange rotates and creates a constant contact on the micro switch, the hopper will continuously fill, and activate the motor back-up safety switch, and short cycle the motor until it is corrected. Again the switch is out of adjustment.

The suspended design utilizes a micro switch attached to the second sliding member, which has a protective cover intended to prevent dust and debris from effecting the micro switch, and also acts as a means to secure the micro switch within the electrical enclosure. The protective cap fails in a short period of time, and allows the environment to attack it, and it will become sticky from dust and/or insects, and thus will fail to operate due to dust and debris, or moisture or water from washing the facility will enter the switch and cause it to burn out.

Additionally, the affixed micro switch enclosure, which is user adjustable, is made from plastic and breaks easily, rendering the whole device useless.

The contacting method of the suspended style device relies on the second member to contact the first member, where the flange will activate a micro switch, which is permitted to travel approximately ¼ to ⅜ of an inch, from the closed position of the contact switch, to its released, open position stopping power to the electrical motor. This switch design is very easily bumped and banged from livestock, and regularly runs short electrical cycles, even when it is running normal operating cycles (about 5 to 10 seconds). This repeated action causes premature failure in micro switches and electric motors. Micro switches burnout regularly.

Thus, each existing switch still presents an opportunity for a no feed situation to the livestock, creating an event of stress and inefficiency in the production cycle. These events cause lost production and quality, and in many times, especially in the case of weight gain, a bird or producer may never recover from.

SUMMARY

For decades, there has not been a hopper control system which could operate, and continue to operate in an agricultural setting, which can be depended on, the hopper control switch should be working properly, and should be a reliable piece of equipment. On a large scale farming operation, on an almost daily basis, current versions of hopper control switches do not function properly. The malfunctions are not a result improper installation. The primary failures are that each device, though made well, and conceived well, do not overcome certain challenges, such as exposure to the elements of extreme dust and moisture, flies and other insects, switches with current ratings just strong enough to handle starting loads of the motors, bouncing and burning out of switches and/or expensive electric motors, and components bending or breaking from weak construction or plastics.

There needs to be a new standard of performance on these critical service devices. It is unacceptable to have failures which influence an animal's comfort and wellbeing, or their performance. The actuator disclosed herein has overcome and conquered many of the challenging aspects for which these types of devices are intended, in its own unique design.

Primarily incorporating a magnet which travels along a sliding member, to interact with a switch which has bonded to it another magnet with the same poles facing each other, (the magnets will repel each other) provides a superior method of actuating a micro switch inside of an approved electrical enclosure. By eliminating the direct contacting method to actuate a micro switch, the micro switch on the disclosed controller is allowed to be ultimately protected from all elements and exposures to flies and whatever it may be. Adding complimentary corners to the components of the sliding member help prevent twisting of the actuator.

Thus, in one aspect, there is provided a hopper control actuator comprising:

a frame having a first bracket at a top end for attaching to a hopper, a second bracket at a bottom end for attaching to an overhead support, and at least one strut between the top end and bottom end; a sliding member attached to the frame having of an outer tube, an inner tube and a spring, the inner tube being slidable within the outer tube and having a first magnet affixed on an exterior surface thereof, the spring being connected to the inner tube and the first bracket, the inner tube and the outer tube having complimentary corners to prevent rotation; and an electrical enclosure having a micro-switch mounted therein, the electrical enclosure being attached to the at least one strut and the micro-switch having an actuating lever with a second magnet affixed thereto such that a like pole faces a like pole of the first magnet along a length of a path of travel of the first magnet.

DETAILED DESCRIPTION

To the accomplishment of the foregoing and related ends, certain illustrative aspects are described herein in connection with the following description and the annexed drawings. These aspects are indicative of the various ways in which the principles disclosed herein can be practiced. Other advantages and novel features will become apparent from the following detailed description when considered in conjunction with the drawings.

A hopper control actuator will now be described that has the priority of maintaining reliability and dependability in any condition presented in the growing cycle. This hopper switch design is not dependant on its placement within the flow of the feed, nor does it serve to function as a contact switch based on the weight of the feed in the hopper.

The disclosed actuator control operates as a switch in a circuit, via a noncontact means and does not rely on an electrical relay installation, nor a magnetic sensor which communicates to a micro-controller, or require the use of a magnetic Reed switch, like other existing switches require.

Figure 1:
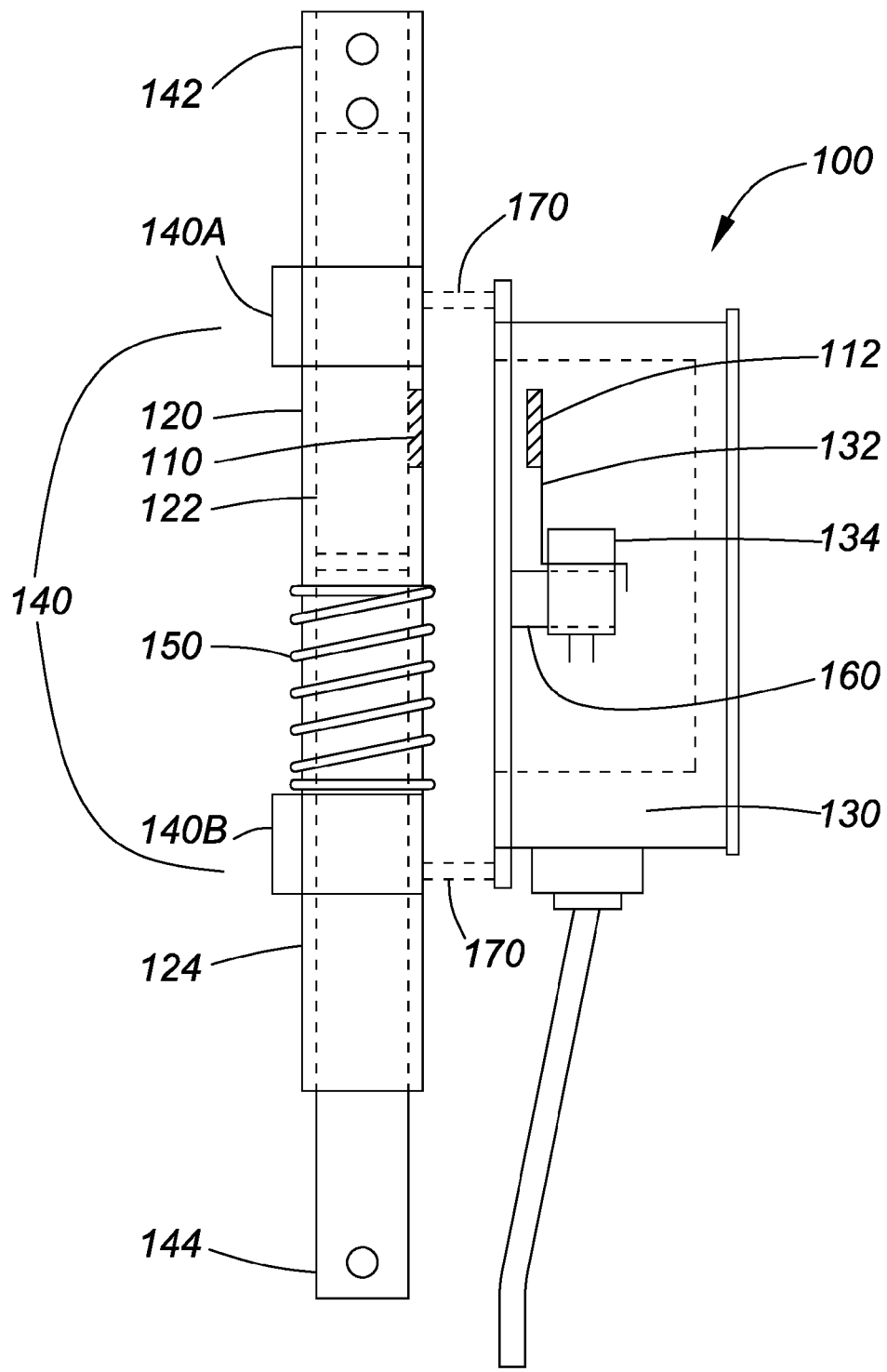
FIG. 1 is line drawing of a hopper control actuator in accordance with one example embodiment of the present disclosure.
Figure 2:
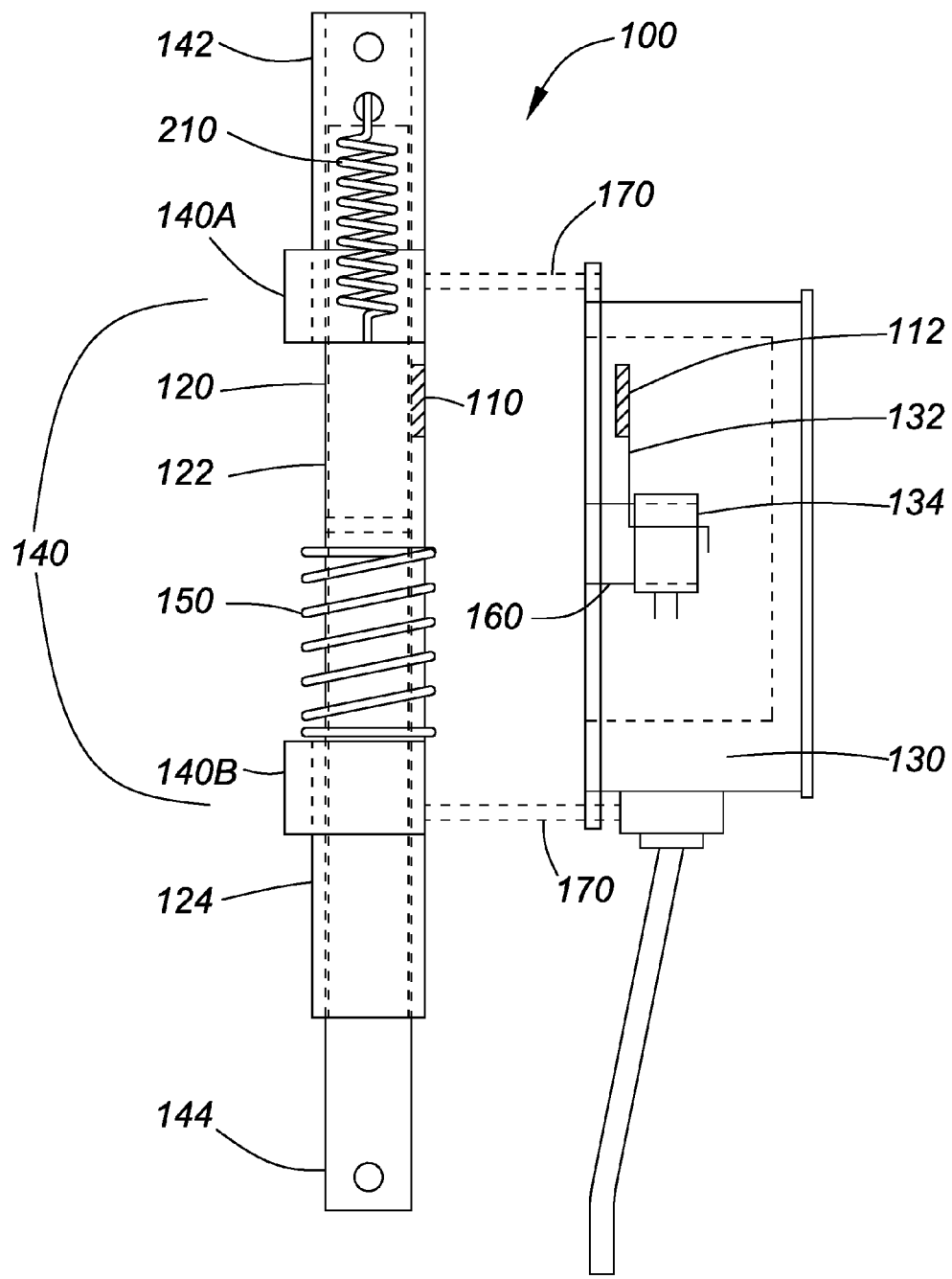
FIG. 2 is line drawing of a hopper control actuator in accordance with one example embodiment of the present disclosure.
Figure 4:
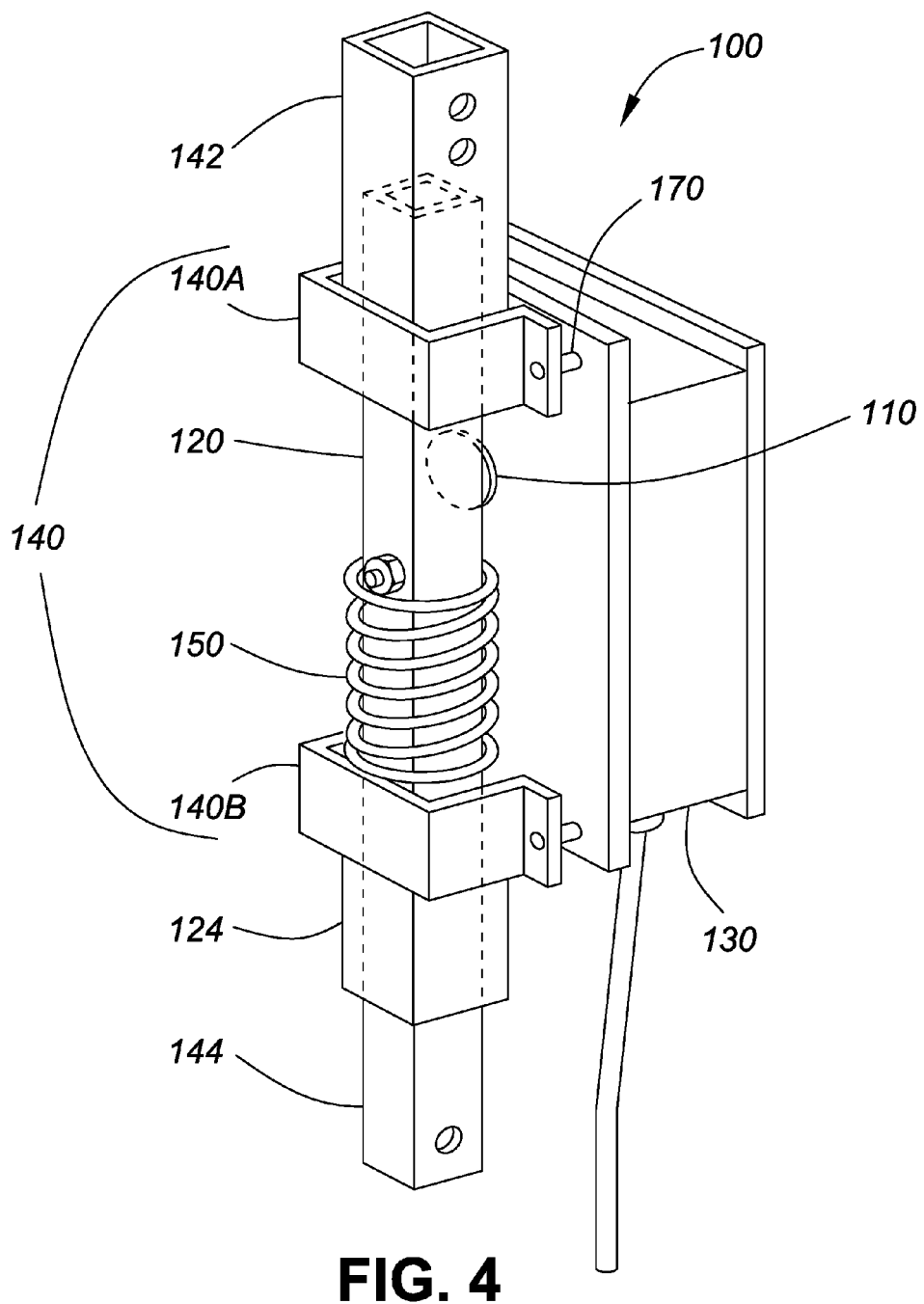
FIG. 4 is a perspective view line drawing of the hopper control actuator shown in FIG. 1.

Referring to FIGS. 1 and 2, a Hopper Control Actuator 100 relies on the positioning of two magnets, a first magnet 110 on a slidable member 120 of the device, facing the direction of an electrical enclosure 130. A second magnet 112 is strategically placed and firmly bonded on the actuating lever 132 of a micro-switch 134, and the micro-switch is then installed onto a mounting bracket 160, which is bonded inside of a PVC electrical enclosure 130. When the electrical enclosure 130 is mounted to the actuator 100, the two magnets 110 and 112 will be positioned in close relation to each-other. The hopper control actuator 100 can be held in place with a frame 140. The sliding member 120 comprises an inner tube 122 and an outer tube 124, each with complimentary corners. The inner tube 122 can slide within the outer tube 124. The hopper control actuator 100 is shown in perspective in FIG. 4.

In some embodiments, the hopper control actuator 100 comprises: a frame 140 having a first bracket 140A at a top end 142 for attaching to a hopper 530 (shown in FIG. 3), a second bracket 140B at a bottom end 144 for attaching to an overhead support 522 (shown in FIG. 3), and at least one strut 170 between the top end and bottom end; a sliding member 120 attached to the frame having of an outer tube 124, an inner tube 122 and a spring 150, the inner tube being slidable within the outer tube and having a first magnet 110 affixed on an exterior surface thereof, the spring being connected to the inner tube and the first bracket, the inner tube and the outer tube having complimentary corners to prevent rotation; and an electrical enclosure 130 having a micro-switch 134 mounted therein, the electrical enclosure being attached to the at least one strut and the micro-switch having an actuating lever 132 with a second magnet 112 affixed thereto such that a like pole faces a like pole of the first magnet along a length of a path of travel of the first magnet.

The hopper control actuator 100 is able to actuate the micro-switch 134 from closed position to open position or vise-verse without the need of physically pressing the lever 132 of the micro switch. When the hopper control actuator 100 extends, in a non-rotational linear motion, the magnets in close relation are positioned such that the same magnetic poles are facing each-other, thus causing the magnets to repel one another. The force interacting between the magnets is greater than the force required to actuate the micro-switch by any physical means. The second magnet 112 which is bonded to the micro-switch's lever, is in such a position that it is the only magnet which presents an opportunity to repel away from the interacting magnet 110. The second magnet 112 repels away from the first magnet 110, thus moving an actuating lever of the micro-switch and causing the micro-switch to change its status.

The benefits of this design include simple integration into circuits operating on any world standard Hydro voltages, up to 240 Volts AC cycle, and is capable of maintaining high demand operating loads upwards of 21 Amps of current if needed, or the equivalent of a 1 Horsepower electric motor. This is pretty much the higher of the standard s used in the agricultural industry, typically using a ¾ to ½ Horsepower electric motor to run feeding systems. By installing a varying type of lever actuating micro-switch, this Hopper Control Actuator is capable of controlling circuits utilizing 3 phase power, or Direct Current (DC) voltages, depending on the switch option required.

The hopper control actuator 100 described herein is not be limited to only agricultural uses, but could be used in various other applications such as but not limited to, in forestry or mining, or crushing or sorting aggregates, wherever a very rugged and dependable switch is required. The disclosed hopper control actuator is simple to integrate and capable of withstanding the harshest of environments: wind, wet environments, and highly dusty environments. It is also insect and animal resistant. In embodiments with a watertight enclosure, the disclosed hopper control actuator could be affixed and function in underwater applications. The function of controlling the micro-switch directly via a magnetic influence may have many more real world applications that could include manufacturing and transport industries.

When utilizing the hopper control actuator 100 for its primary function, there are options which can be taken advantage of if needed, such as, the option to integrate this unit into a relay circuit. It is also capable of sending a status indication by using an unused terminal on the micro-switch, which can indicate its status to a light or as an input on a micro-controller.

There are some particular fundamental requirements achieved in this design. Firstly, the design of the actuator frame has been designed to allow an unobstructed area in which the sliding member may be exposed to provide an ideal position to place a magnet, where it will not be interfered with by ferrous metals. Additionally the struts of the frame makeup, also serve as an ideal mounting surface for electrical enclosures or other apparatuses that may get attached. The sliding member is made of a ferrous metal, and provides a superior point to affix a neo-dymium magnet. Also, the electrical enclosure is made of a PVC plastic material, where aluminum may also be used, due to its non-ferrous metal properties, allowing magnetic field energy to radiate through any materials, to the magnet which is firmly bonded to the micro-switch's actuating lever. The two magnets' field of energy causes the magnets to repel each-other. Also to maintain the hopper Control Actuator's 100 correct positioning, in an embodiment, the frame 170 and sliding member 120 are made of square tubing, providing a linear motion which is relied upon to reliably operate this hopper control actuator. Additionally, the embodiment shown in FIG. 2 incorporates an extension spring 210 to assure the accuracy of the sliding member 120. With similar force characteristics to the compression spring 150, the two springs working in unison, provide a smooth and non-binding operation, and complement each other.

The disclosed hopper control actuator or feed switch does not use the weight of the feed to interpret a media within the hopper. This switch uses no direct contact to control the operation of the contact switch, which controls the motor. Magnets allow the contact switch in the electrical box to operate, based on the interaction of a magnet place on a sliding member of the device. The interacting forces between the magnets oppose each other, indicating a need to fill the hopper with feed, thus indicating the motor to run and fill the hopper. While it is filling, the mass of the feed within the hopper is increasing, overpowering the spring bias of the device, extending the sliding member of the device that is changing the position of the magnet which is placed on the sliding member, allowing the interacting forces of the magnets to become weaker. The spring bias within the micro switch overpowers the magnetic forces, and returns the micro switch position to normal, and opens the circuit, cutting power to the electric motor, and stopping the fill to the hopper.

As the feeding system is drawing on the feed within the intermediate hopper, the mass becomes less, and the spring forces in the device become stronger, moving the sliding member of the device upwards. The magnetic interaction between the micro switch magnet and the magnet placed on the sliding member, become stronger, and will become strong enough to overpower the spring bias within the micro switch, throwing the switch into the closed position, closing the circuit and thus, sending power to the motor to fill the hopper again with feed. This cycle continues reliably for the duration of the growing cycle.

Figure 3:
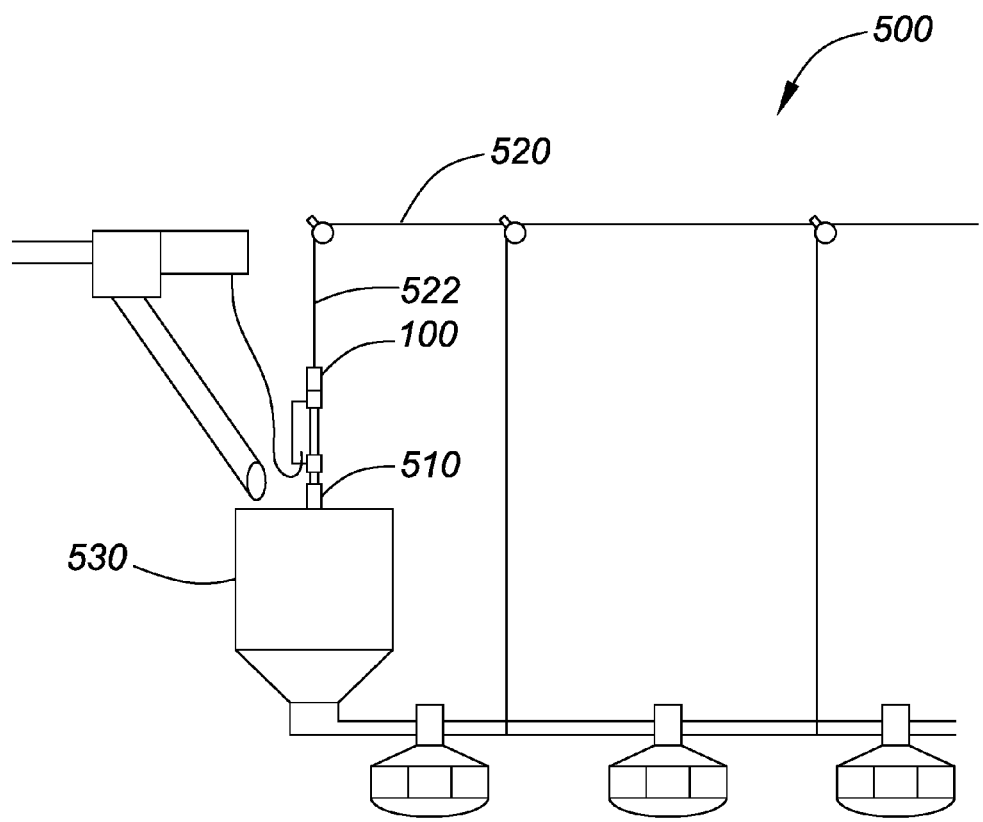
FIG. 3 is line drawing of a feed system including a hopper control actuator in accordance with one example embodiment of the present disclosure.

Referring to FIG. 3, the disclosed hopper control actuator affixes to the hopper hanger 510, and then the assembly is attached to the feed line suspension system 520 from above. Attaching the actuator directly to the hopper 530 prevents it from rotating around. Rotation causes reliability problems and can damage other components of a hopper switch, allowing opportunities for the switch to become compromised by the elements, or the entire switch assembly to break. Thus a preferred embodiment of the disclosed actuator is made not to be cylindrical in which it may spin/rotate within itself, which causes the micro switch to come out of adjustment and fail to operate correctly. By uses square tubing, which may slide within the larger tubing, where the one lower smaller section of tubing is properly affixed to the hopper, any rotation or out of alignment problem is prevented.

In an embodiment, the sliding member and frame are constructed of a steel, giving it superior strength to function properly in all conditions, and prove its reliability in any elements in which it is required to function. It will even withstand abuse and neglect from employees.

The simple design of two sliding members allows for simple construction and utilization of common steel materials, allowing the hopper control actuator to be made using affordable conventional and readily available materials.

The disclosed hopper control actuator allows the hopper to slightly move its position downwards while filling, which provides a little bit of travel room for the slider should it get accidentally bumped by the livestock. It will not allow the motor to start and stop quickly in short cycles, or bounce. When the device is in its run position, it is simply because it is looking to be filled, and no other reason.

Additionally the longer travel between starting position and full position allows the motor to run a more efficient run cycle, increasing efficiency and lifespan of the electric motors, and the electrical switches. The longer travel makes it increasingly difficult to run short cycles between the run and stop position of the switch. The lower number of cycle occurrences in turn results in an increased energy efficiency, caused by the reduced high amp starting loads from the motor, through the micro switch. Additionally, the longer travel in the design effectively prolongs the service life of the electric motor, and also the service life of the electrical micro switch operating the system as a whole.

Furthermore, with the square sliding member embodiments, the design is not permitted to rotate, locking it to function on a single linear axis.

The design also prevents any interference with the micro switch, and ultimately the proper operation and function of the micro switch. The design is such that non-ferrous metals or plastics are used to protect and secure the micro switch, while the properties of these materials are non-magnetic, thus will not interfere with the interacting fields of energy from the magnets. Additionally by design, the frame of the device is designed as such that the magnet positioned on the sliding member, is permitted to interact with the micro switch without interference from ferrous materials, preventing the magnets' attracting forces to areas not intended. This design and other design concepts could conceivably be made from non-ferrous materials, such as but not limited to plastic, though common steel was selected for strength and lower cost of production. By eliminating all interfering factors such as dust, water, insects, mechanical components, and any interfering magnetic materials, the most reliable operation and preservation of the components of the device is ensured.

By not allowing it to rotate, this device is able to utilize an area of travelling surface to affix a magnet, which doesn't do much on its own, and while sitting there, is unaffected by dust or debris, flies and other insects, livestock or anything of the such.

The attached electrical enclosure contains within it, a custom made and positioned mounting bracket 160, which holds a micro switch 134, the micro switch has a magnet 112 affixed to the actuating lever 132. The magnetic field on the micro switch, which is facing the magnet 110 on the sliding member 120 of the disclosed actuator, have the same magnetic poles facing each other, creating a pushing effect. Because of their positioning in the frame 140 design, the interactions of the magnets are without interference from the steel frame of the invention. In some embodiments, the electrical enclosure 130 is made of PVC or can be made of plastic or aluminum, so as not to interact with the magnet of the device.

Because it interacts magnetically, the micro switch 134 can be housed in a completely sealed and protected environment, and does not rely on a mechanical actuation, via a pushrod, rail or flange, etc., to operate. The operating forces between the two magnets have enough strength to overpower the spring in the snap action micro switch, and close the switch to signal the motor to run. While filling, the sliding member 120 of the invention extends lower, and the affixed magnet to the slider bar travels lower with the slider bar. That is changing the interacting magnets positions, and will move out of each-other's influencing fields, and the spring in the snap-action micro switch will overpower the magnetic fields and open the switch, turning off the power to the electrical motor.

The distance of travel between starting position and stopped position is great enough that it resists impacts and bangs from livestock, and does not allow short run cycles of the electric motors, saving motors and micro switches. In other hopper switch designs, as the system turns off, the micro switch has extended to the point of which there is no mechanical device depressing the micro switch lever or button, to simply turn off the circuit. The micro switch's button or lever has a short range of travel, typically between 0.125 and 0.375 of an inch of travel from the open and close position of the switch. It is not uncommon to see bouncing cycles of 3-8 on/off cycles, and the normal operation of this type of travel generally represents approximately 5 to 15 seconds of motor run time, per complete cycle.

The longer travel allowed by the disclosed Hopper Control Actuator eliminates incidental short cycling and any bouncing, causing short cycle run times for the motor. Typical run cycles to fill a hopper with feed are 15-30 seconds, with no bounce. This is achieved by the interactions of the magnets, and its key fundamental element of a non-contact mode to operate the micro switch. The benefits from non-contact operation of the micro switch, in regards of performance, is that the micro switch is not immediately effected by forces or actions to the Hopper Control Actuator's body, or from the feeding system being jarred and/or incurring impacts from livestock. The Hopper Control Actuator allows for 0.375 to 0.750 inches of travel between start and stop cycles. By eliminating the "mechanical link" to operate the micro switch, the magnetic interaction offers a complimentary field effect, allowing some varying motions from the feeding system through the device, beneficial to the entire system.

In some embodiments, the frame 140 is constructed of steel for strength and cost considerations. It is a readily available and affordable material to utilize for this device.

Some non-limiting advantages of various embodiments of the disclosed actuator include:
Efficient linear motion of the sliding component, simply attaching to the hopper and
hanging from suspension cable.
Minimal one-time adjustment and setup.
Manufactured from steel, provides ultimate strength and reliability, no bending or
breaking this device.
Easy to use and affordable materials.
Simple design and travel allow efficient use of motor and switch, in regards to run-time,
extending the lifespan of these components of the system.
Micro switches which are bolt mounted, allowing for replacement when required,
saving downtime and money by not having to buy complete units, just the necessary parts.
Easy to service, electrical components are removable without the need to remove the
whole device from the hopper or feed system.
Completely un-affected by dust insects moisture, washing, misuse and neglect.
Can be made from CSA approved components and enclosures.
No flaps getting stuck or micro switches exposed, or vulnerable to damages.
Incorporating extension and compression springs for reliability.
Simple design for easy manufacturing.
Superior bonding of the brackets and micro switches, and magnets to prevent failures.
Heavy duty over-rated switches to reduce the likelihood of a switch failure due to burn
out of contacts, providing maximum service life of micro switches.
Can be easily incorporated in the production farming areas of Turkeys, Chickens, and Pork industries.

A preferred embodiment of the disclosed actuator contains no critical components to be made of plastic. The Harkin's Hopper switch described in the Background section is comprised of an adjustable clamping device, which contains the micro switch components, all to be clamped into position on the second sliding member, and it is made of molded plastic, which breaks easily, and the switch is rendered useless. Repairing the device also requires that the entire device is removed from the system, repaired, and then re-installed. Whereas the actuator disclosed herein allows electrical components to be removed for repairs leaving the feeding system intact and still functional.

In comparison, the cylindrical design of the Harkin's Hopper Control is at a disadvantage to the squared embodiment of the actuator disclosed herein. The squared or angular design prevents the device from coming out of adjustment, and eliminates the need for any adjustment after initial installation, making this design superior and more reliable and dependable.

The Flange is a deficient component in the design of the prior art design. The flange is a fundamental element to the operation of the switch, and is vulnerable to defects through manufacturing and misuse or mistreatment at the farming facilities. From new, these flanges have been bent, or installed off-square, and are sometimes subjected to conditions which may damage the flange and effect its reliable operation. By contrast, the actuator described herein requires no physical member to actuate the micro switch. Rather, it uses magnets.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations. Furthermore, to the extent that the term "includes" is used in either the detailed description or the claims, such term is intended to be inclusive in a manner similar to the term "comprising" as "comprising" is interpreted when employed as a transitional word in a claim.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

The invention claimed is:

1. A hopper control actuator comprising:
   a frame having a first bracket at a top end for attaching to a hopper, a second bracket at a bottom end for attaching to an overhead support, and at least one strut between the top end and bottom end;
   a sliding member attached to the frame having of an outer tube, an inner tube and a spring, the inner tube being slidable within the outer tube and having a first magnet affixed on an exterior surface thereof, the spring being connected to the inner tube and the first bracket, the inner tube and the outer tube having complimentary corners to prevent rotation; and
   an electrical enclosure having a micro-switch mounted therein, the electrical enclosure being attached to the at least one strut and the micro-switch having an actuating lever with a second magnet affixed thereto such that a like pole faces a like pole of the first magnet along a length of a path of travel of the first magnet.

2. The hopper control actuator of claim 1 wherein the inner tube and outer tube both have squared corners.

3. The hopper control actuator of claim 1 wherein the inner tube and outer tube comprise ferrous metal.

4. The hopper control actuator of claim 1 wherein the first magnet and the second magnet comprise neo-dymium magnets.

5. The hopper control actuator of claim 1 wherein the electrical enclosure comprises PVC plastic.

6. The hopper control actuator of claim 1 wherein the electrical enclosure comprises aluminum.

7. The hopper control actuator of claim 1 further comprising a second spring connecting the inner tube to the second bracket.

8. The hopper control actuator of claim 1 wherein the micro-switch is a snap action micro-switch.

9. The hopper control actuator of claim 1 wherein the micro-switch is bolted to the electrical enclosure.

10. The hopper control actuator of claim 1 wherein the micro-switch is activated when the like pole of the first magnet aligns with the like pole of the second magnet.

* * * * *